A. W. HARRINGTON, Jr.
ADHESIVE STICK.
APPLICATION FILED JAN. 2, 1909.
990,354.
SPECIMENS.
Patented Apr. 25, 1911.
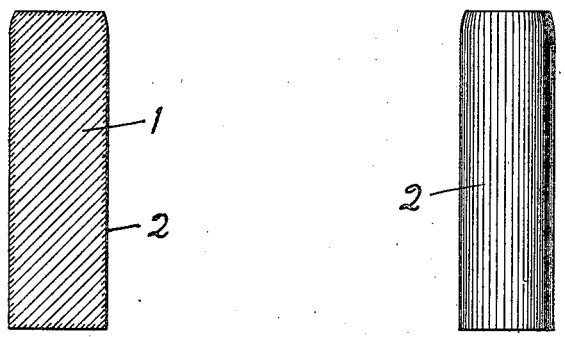
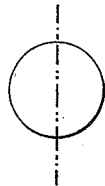
WITNESSES
L. C. Kennedy
J. Donsbach
INVENTOR
Arvin W. Harrington Jr.
by Mosher Curtis
atty.

UNITED STATES PATENT OFFICE.

ARVIN W. HARRINGTON, JR., OF TROY, NEW YORK.

ADHESIVE STICK.

990,354.

Specification of Letters Patent. Patented Apr. 25, 1911.

Application filed January 2, 1909. Serial No. 470,326. (Specimens.)

*To all whom it may concern:*

Be it known that I, ARVIN W. HARRINGTON, Jr., a citizen of the United States, residing at Troy, county of Rensselaer, and State of New York, have invented certain new and useful Improvements in Adhesive Sticks, of which the following is a specification.

The invention relates to such improvements and consists of the novel construction and combination of parts hereinafter described and subsequently claimed.

Reference may be had to the accompanying drawings, and the reference characters marked thereon, which form a part of this specification. Similar characters refer to similar parts in the several figures therein.

The object of the invention is to provide a soft, sticky or adhesive substance in a form and condition suitable for convenient application by hand to the handles of tools, golf-sticks, or the like, and which will permit of said substance being freely carried in the pocket of the user without danger of its adhering to the pocket.

The invention consists in providing a composite stick of adhesive material having its inner portion comparatively soft and sticky at ordinary temperatures, and its outer portion comparatively rigid, non-adhesive and easily abraded at ordinary temperatures, as hereinafter more fully described and subsequently pointed out in the claims.

Figure 1 of the drawings is a side view in plan of the improved stick. Fig. 2 is a central, longitudinal section of the stick, taken on the broken line 2—2 in Fig. 3. Fig. 3 is an end view of the stick.

The stick is preferably made cylindrical in form, and of a length equal to several times the diameter of the stick.

The inner portion, 1, of the stick is composed of a substance soft, pliable and sticky at ordinary temperatures, and readily adapted for distribution, by rubbing over the handles of athletic or sporting devices, such as the handles of golf-sticks. Any known substance or mixture having these characteristics may be used for the purpose. I have found suitable for this purpose a mixture of equal parts of pitch and beeswax, and, for certain purposes, I prefer to use equal parts of white pitch and Japan wax. The relative proportions of the ingredients of the mixture can be varied to secure the desired stickiness or tackiness at ordinary temperatures in the climate in which the stick is to be used.

The outer portion, 2, of the stick may be made of any substance or mixture which at ordinary temperatures is comparatively hard or rigid, non-adhesive and easily abraded, whereby it is adapted to support the softer inner portion, 1, of the stick, and to give rigidity and strength to the composite stick, and provide the same with a hard, non-adhesive surface, which, however, is easily abraded in the use of the stick. I have found ordinary commercial rosin a suitable substance for the outer portion, 2, of the stick.

In making the composite stick, the outer portion of the stick may be first made in the form of a hollow body, which is subsequently filled with the inner sticky portion, or the inner sticky portion may be first made in the form of a core, and then quickly dipped in the melted rosin, the dipping operation being repeated, if desired, to increase the thickness of the supporting shell for the soft inner portion of the stick.

In the use of such a stick, it is only necessary to grasp the same firmly in the hand, or between the thumb and finger of one hand, and rub one end of the stick along the handle to be treated, holding the stick in a position such that its axial line will be approximately at right angles to the axial line of the handle, whereupon the inner and outer portions of the stick are simultaneously abraded and deposited on the handle, imparting thereto a sticky, adhesive surface which greatly facilitates the manipulation of the tool or other article provided with such handle. The operation can be repeated as often as desired until the stick is abraded and worn down to a minimum size adapted to be conveniently held between the thumb and finger.

I am thus able to produce a new and useful article of manufacture, which has proved a great convenience and help to those using handled articles.

What I claim as new and desire to secure by Letters Patent is—

1. An adhesive stick of the class described having its inner portion composed of a comparatively soft, adhesive mixture, and its outer portion composed of a comparatively rigid and non-adhesive, resinous substance.

2. A device of the class described comprising an inner portion composed of a mixture containing pitch and a fatty substance comparatively soft and tacky at ordinary temperatures, and a supporting, easily abraded inclosure therefor composed of a comparatively hard resinous substance.

In testimony whereof, I have hereunto set my hand this 29th day of Dec. 1908.

A. W. HARRINGTON, JR.

Witnesses:
L. C. KENNEDY,
J. DONSBACH.